US012572741B2

(12) United States Patent
Singh et al.

(10) Patent No.: US 12,572,741 B2
(45) Date of Patent: Mar. 10, 2026

(54) DETERMINING LINKED SPAM CONTENT

(71) Applicant: Pinterest, Inc., San Francisco, CA (US)

(72) Inventors: Vishwakarma Singh, Sunnyvale, CA
(US); Yuanfang Song, Sunnyvale, CA
(US)

(73) Assignee: Pinterest, Inc., San Francisco, CA (US)

( * ) Notice: Subject to any disclaimer, the term of this
patent is extended or adjusted under 35
U.S.C. 154(b) by 583 days.

(21) Appl. No.: 17/866,367

(22) Filed: Jul. 15, 2022

(65) Prior Publication Data

US 2024/0020476 A1     Jan. 18, 2024

(51) Int. Cl.
*G06F 40/284*          (2020.01)
*G06F 16/93*           (2019.01)
*G06F 21/55*           (2013.01)

(52) U.S. Cl.
CPC ........... *G06F 40/284* (2020.01); *G06F 16/93*
(2019.01); *G06F 21/554* (2013.01); *G06F*
*2221/034* (2013.01)

(58) Field of Classification Search
CPC ...... G06F 40/284; G06F 16/93; G06F 21/554;
G06F 2221/034
See application file for complete search history.

(56) References Cited

U.S. PATENT DOCUMENTS

| | | | |
|---|---|---|---|
| 8,438,499 B2 | 5/2013 | Dixon et al. | |
| 8,448,245 B2 | 5/2013 | Banerjee et al. | |
| 9,356,941 B1 * | 5/2016 | Kislyuk | ................. H04L 63/14 |
| 11,310,268 B2 * | 4/2022 | Bowditch | .............. G06N 20/00 |
| 11,336,689 B1 * | 5/2022 | Miramirkhani | ..... H04L 63/0281 |
| 2009/0292984 A1 * | 11/2009 | Bauchot | ................. G06Q 30/02 |
| | | | 345/581 |
| 2016/0034950 A1 * | 2/2016 | Schroeder | .......... G06Q 30/0248 |
| | | | 705/14.47 |
| 2017/0222960 A1 * | 8/2017 | Agarwal | .............. G06Q 10/107 |
| 2021/0203693 A1 * | 7/2021 | Clausen | .............. H04L 63/1425 |

(Continued)

FOREIGN PATENT DOCUMENTS

| | | | | | |
|---|---|---|---|---|---|
| CN | 112511525 A | * | 3/2021 | ......... | G06F 18/2415 |
| CN | 109510815 B | * | 1/2022 | ........... | G06F 18/214 |

(Continued)

OTHER PUBLICATIONS

Feng et al. â A Detection Method for Phishing Web Page Using
DOM-Based Doc2Vec Model (Year: 2020).*

(Continued)

*Primary Examiner* — Philip J Chea
*Assistant Examiner* — Jasmine Mochen Day
(74) *Attorney, Agent, or Firm* — Haynes and Boone, LLP

(57) ABSTRACT

Systems and methods for determining whether a linked
content page may include spamming, malicious, and/or
otherwise undesirable content. The linked content page may
be crawled, scraped, and/or parsed to extract various infor-
mation associated with the text, media items, and/or struc-
ture of the linked content page. The text, media, and/or
structure information may be analyzed and processed to
generate one or more textual features, media features, and/or
structural features, which may then be processed by a trained
machine learning model to determine whether the content
page includes spamming, malicious, and/or otherwise unde-
sirable content.

19 Claims, 10 Drawing Sheets

(56) References Cited

U.S. PATENT DOCUMENTS

2021/0377303 A1* 12/2021 Bui .......................... G06F 40/14
2022/0121984 A1* 4/2022 Gupta .................... G06N 20/20
2022/0222437 A1* 7/2022 Lauber .................... G10L 15/26

FOREIGN PATENT DOCUMENTS

CN          113901376 A  *  1/2022    ........... G06F 18/214
CN          114730339 A  *  7/2022    ........... H04L 63/145

OTHER PUBLICATIONS

Bannur et al.—Judging a Site by its Content: Learning the Textual, Structural, and Visual Features of Malicious Web Pages (Year: 2011).*
Choi, Hyunsang et al. "Detecting Malicious Web Links and Identifying Their Attack Types." WebApps 2011, Proceedings of the 2nd USENIX conference on Web application development, (Jun. 15, 2011), 12 pages.
Sahoo, Doyen et al. "Malicious URL Detection using Machine Learning: A Survey." ArXiv abs/1701.07179 (2017): vol. 1, Article 1, Aug. 2019, URL: https://arxiv.org/abs/1701.07179, 37 pages.

* cited by examiner

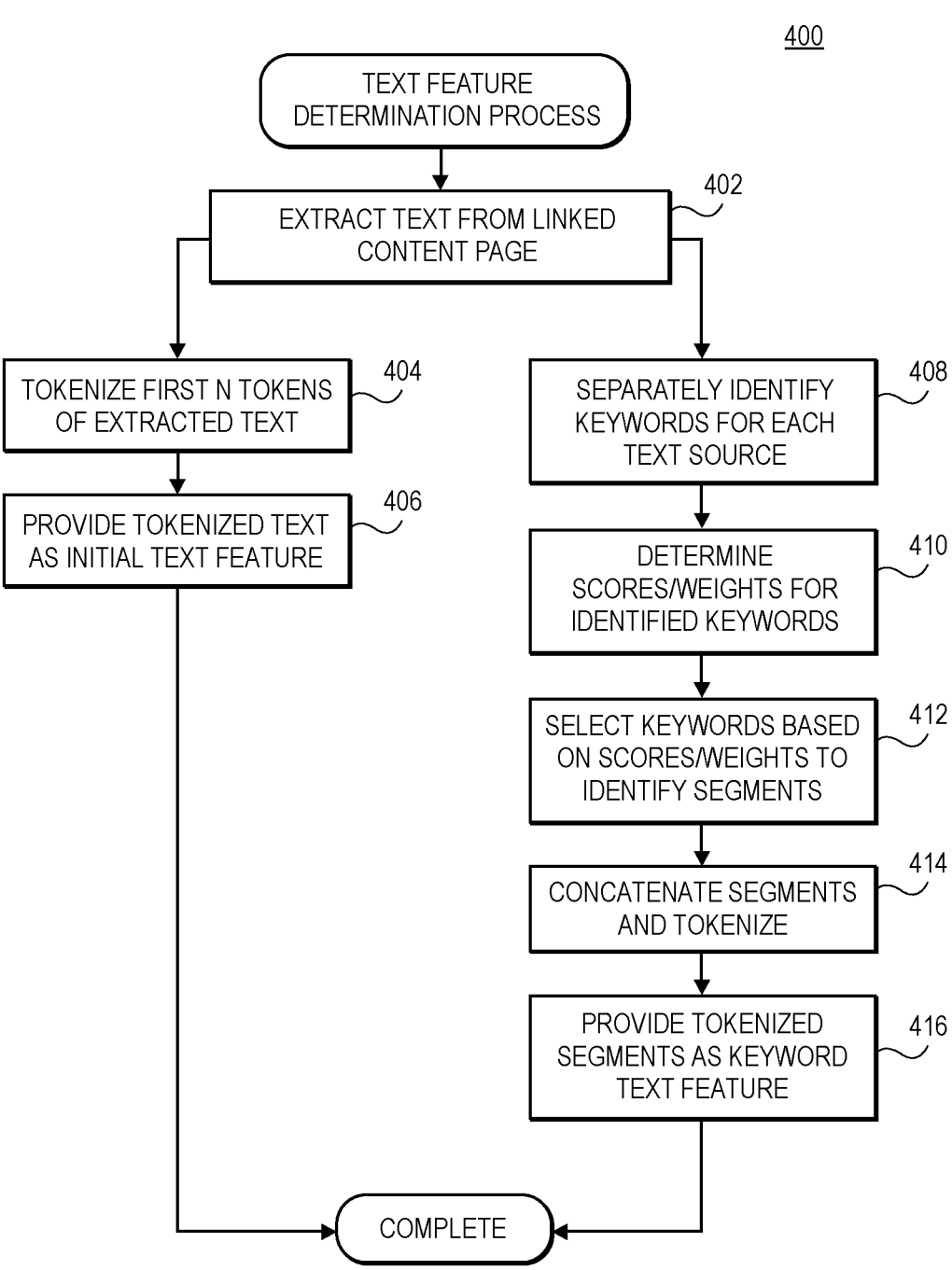

400

TEXT FEATURE
DETERMINATION PROCESS

EXTRACT TEXT FROM LINKED
CONTENT PAGE                402

TOKENIZE FIRST N TOKENS
OF EXTRACTED TEXT          404

PROVIDE TOKENIZED TEXT
AS INITIAL TEXT FEATURE    406

SEPARATELY IDENTIFY
KEYWORDS FOR EACH
TEXT SOURCE               408

DETERMINE
SCORES/WEIGHTS FOR
IDENTIFIED KEYWORDS       410

SELECT KEYWORDS BASED
ON SCORES/WEIGHTS TO
IDENTIFY SEGMENTS         412

CONCATENATE SEGMENTS
AND TOKENIZE             414

PROVIDE TOKENIZED
SEGMENTS AS KEYWORD
TEXT FEATURE             416

COMPLETE

MEDIA FEATURE DETERMINATION
PROCESS

EXTRACT MEDIA FROM LINKED CONTENT
PAGE                                                502

COMPARE EXTRACTED MEDIA TO MEDIA
ON OTHER CONTENT PAGES                              504

DETERMINE MEDIA SCORE                              506

PROVIDE MEDIA SCORE AS MEDIA
FEATURE                                            508

COMPLETE

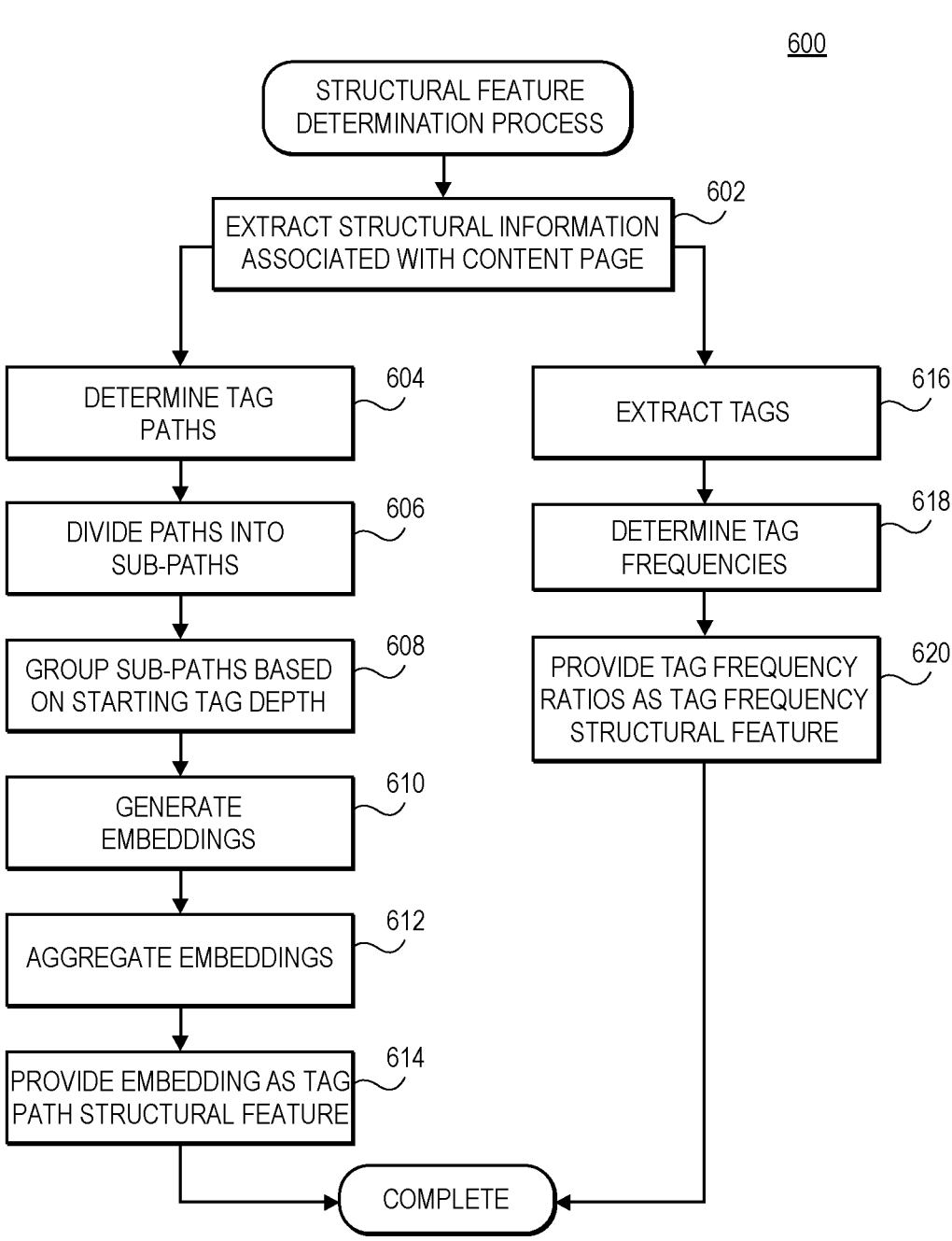

600

STRUCTURAL FEATURE
DETERMINATION PROCESS

EXTRACT STRUCTURAL INFORMATION
ASSOCIATED WITH CONTENT PAGE ⟩602

DETERMINE TAG
PATHS ⟩604

DIVIDE PATHS INTO
SUB-PATHS ⟩606

GROUP SUB-PATHS BASED
ON STARTING TAG DEPTH ⟩608

GENERATE
EMBEDDINGS ⟩610

AGGREGATE EMBEDDINGS ⟩612

PROVIDE EMBEDDING AS TAG
PATH STRUCTURAL FEATURE ⟩614

EXTRACT TAGS ⟩616

DETERMINE TAG
FREQUENCIES ⟩618

PROVIDE TAG FREQUENCY
RATIOS AS TAG FREQUENCY
STRUCTURAL FEATURE ⟩620

COMPLETE

FIG. 6

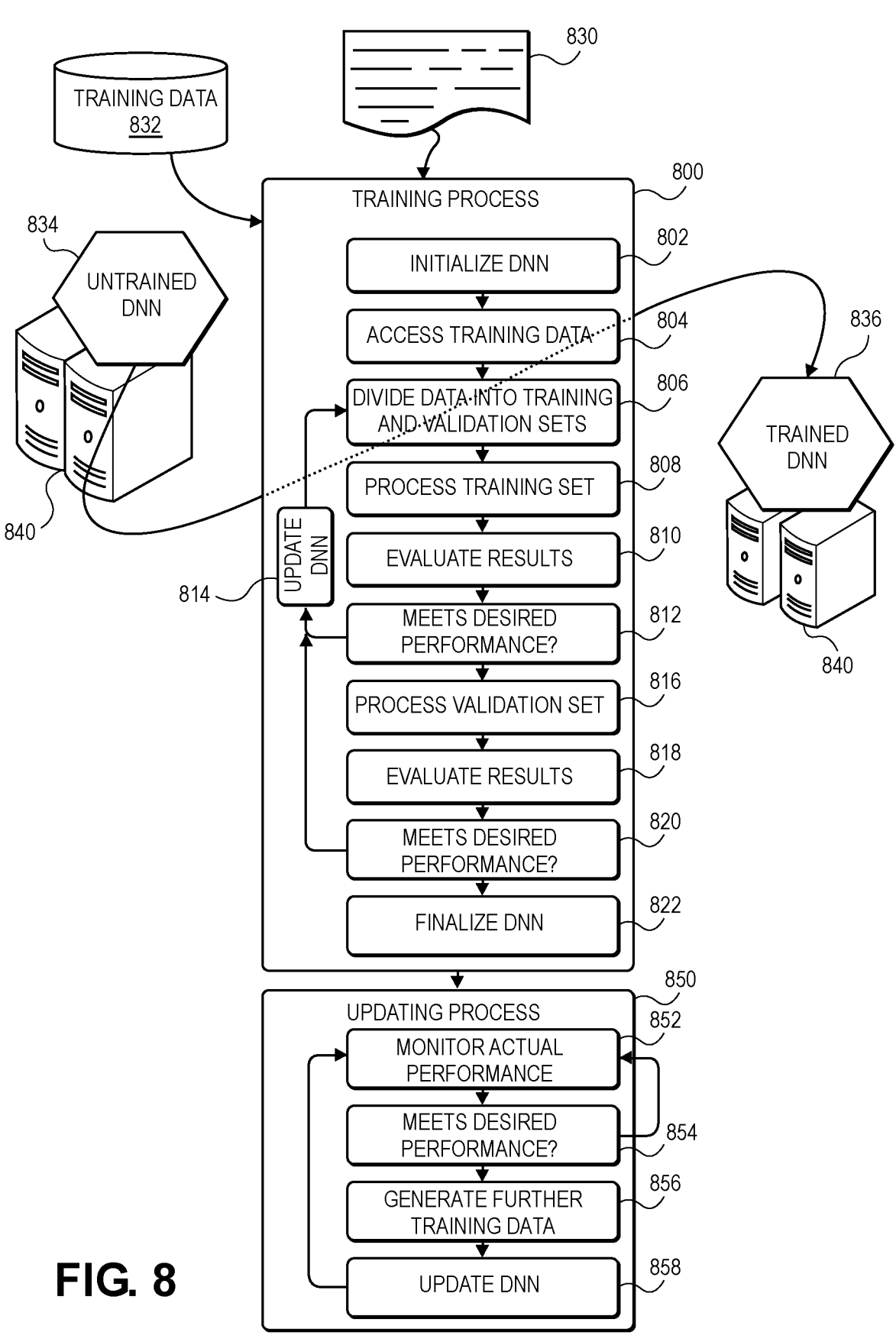

830

TRAINING DATA
832

834

UNTRAINED
DNN

840

800

TRAINING PROCESS

802   INITIALIZE DNN

804   ACCESS TRAINING DATA

806   DIVIDE DATA INTO TRAINING AND VALIDATION SETS

808   PROCESS TRAINING SET

810   EVALUATE RESULTS

812   MEETS DESIRED PERFORMANCE?

814   UPDATE DNN

816   PROCESS VALIDATION SET

818   EVALUATE RESULTS

820   MEETS DESIRED PERFORMANCE?

822   FINALIZE DNN

836

TRAINED
DNN

840

850   UPDATING PROCESS

852   MONITOR ACTUAL PERFORMANCE

854   MEETS DESIRED PERFORMANCE?

856   GENERATE FURTHER TRAINING DATA

858   UPDATE DNN

FIG. 8

DETERMINING LINKED SPAM CONTENT

BACKGROUND

The amount of accessible content is ever expanding. For example, there are many online services that host and maintain content for their users and subscribers. Further, in connection with the hosting and maintenance of the accessible content, many content items may include a link and/or other location identifier (e.g., uniform resource locator, etc.) to associated content pages (e.g., webpage and the like). Oftentimes, the linked content pages can include spamming, malicious, and/or otherwise undesirable content. Such content pages often include low quality content that may disproportionately include marketing content relative to substantive, useful content. Further, although online services that host and maintain content may have a desire to identify and protect their users and subscribers from such spamming, malicious, and/or otherwise undesirable content pages, detection of such spamming, malicious, and/or otherwise undesirable content pages can be difficult.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein:

FIG. 4 is a flow diagram illustrating an exemplary text feature determination process, according to exemplary embodiments of the present disclosure.

FIG. 6 is a flow diagram illustrating an exemplary structural feature determination process, according to exemplary embodiments of the present disclosure.

FIG. 8 is a flow diagram of an exemplary deep neural network training process, according to exemplary embodiments of the present disclosure.

DETAILED DESCRIPTION

Figure 1:
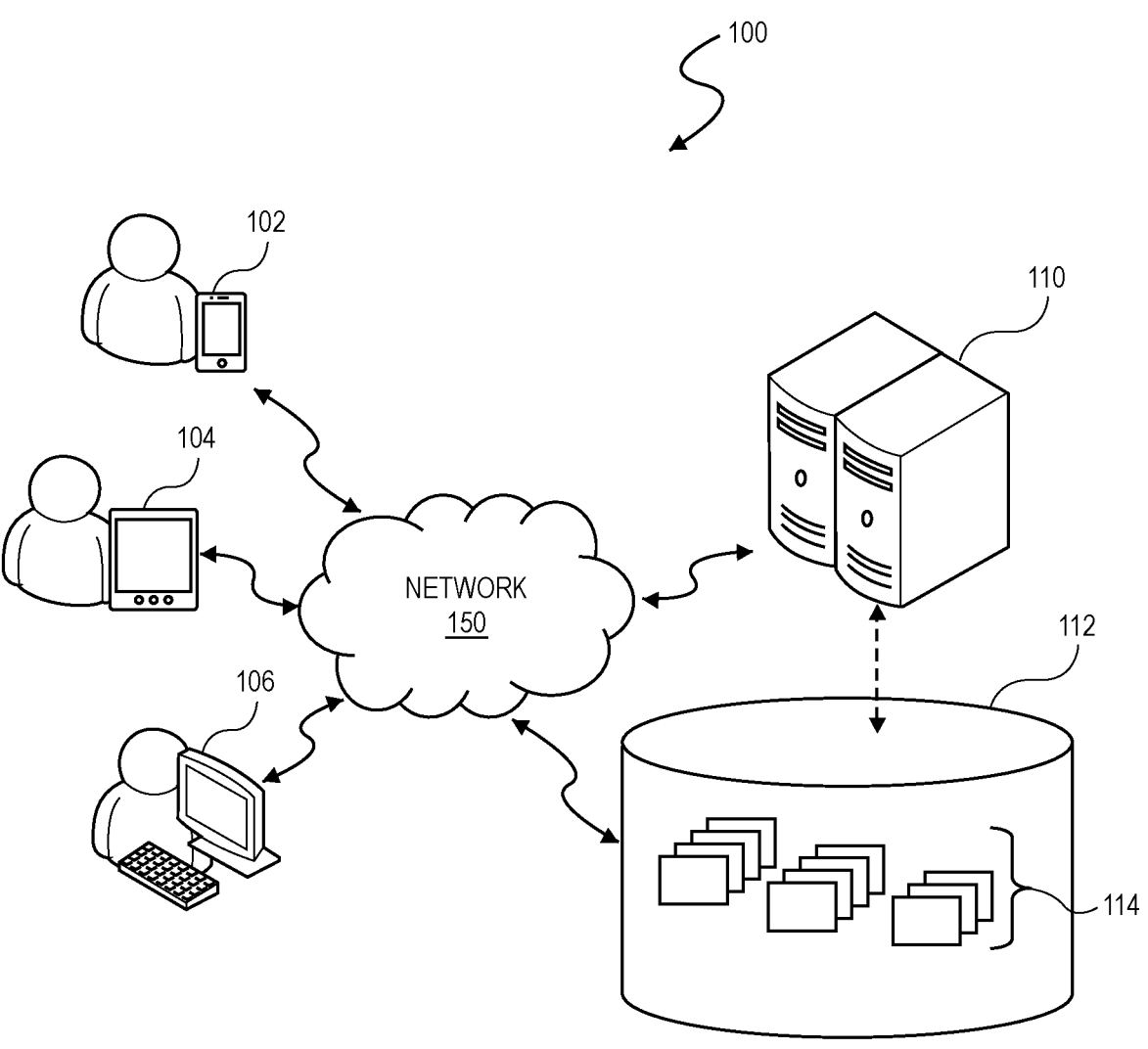
FIG. 1 is an illustration of an exemplary computing environment, according to exemplary embodiments of the present disclosure.

As set forth in greater detail below, exemplary embodiments of the present disclosure are generally directed to systems and methods for determining whether a linked content page may include spamming, malicious, and/or otherwise undesirable content. In exemplary implementations, content (e.g., content items, media items, webpages, etc.) stored and maintained by an online service may be linked and/or otherwise associated with other content pages (e.g., a webpage, etc.), and exemplary embodiments of the present disclosure can facilitate determination of whether a linked content page may include spamming, malicious, and/or otherwise undesirable content.

According to exemplary embodiments of the present disclosure, linked content pages may be crawled, scraped, and/or parsed to extract various information associated with the text, media items, and/or structure of the linked content page. The text, media, and/or structure information may be analyzed and processed to generate one or more textual features, media features, and/or structural features, which may then be processed to determine whether the content page includes spamming, malicious, and/or otherwise undesirable content. In connection with the textual features, the text of the content page can be processed to determine an initial textual feature, which may correspond to an initial portion of the text included in the linked content page, and a keyword textual feature, which may correspond to weighted and/or scored keywords included in the linked content page. For example, the linked page may be processed to identify and tokenize the first N-number of tokens as the initial textual feature. The text of the linked page may also be processed to identify, score, and/or weight keywords appearing in the text, which may be tokenized as the keyword textual feature. Additionally, the media items included in the content page can be processed to determine a media feature that corresponds to a frequency that the media items are included in other content pages stored and maintained by the online service. Further, the structure of the content page can also be processed to determine a tag path structural feature and a tag frequency structural feature. For example, tag paths included in the structure of the content page can be identified and tokenized as the tag path structural feature, and a frequency of certain tags appearing in the structure of the content can correspond to the tag frequency structural feature.

According to exemplary implementations, the various features related to the text of the content page, the media items included in the content page, and/or the structure of the content page can be processed by one or more trained machine learning models (e.g., a deep neural network, a multi-layer perceptron (MLP) network, etc.) to determine whether the content page includes spamming, malicious, and/or otherwise undesirable content. Subsequently, the output from the natural language processing of the textual information, the media information, and the structural information associated with the content page can be processed by one or more trained machine learning models to determine whether the content page includes spamming, malicious, and/or otherwise undesirable content.

Advantageously, exemplary embodiments of the present disclosure improve upon existing and traditional methods of identifying spamming, malicious, and/or otherwise undesirable content. For example, exemplary implementations of the present disclosure can facilitate determination and utilization of certain textual, media, and/or structural features associated with the content page in connection with determining whether the content page may include spamming, malicious, and/or otherwise undesirable content in determining whether the content page includes spamming, malicious, and/or otherwise undesirable content. Accordingly, determining spamming, malicious, and/or otherwise undesirable content based on the textual, media, and/or structural features according to exemplary embodiments of the present disclosure can facilitate efficient and accurate determination of content pages that may include spamming, malicious, and/or otherwise undesirable content.

FIG. 1 is an illustration of an exemplary computing environment 100, according to exemplary embodiments of the present disclosure.

As shown in FIG. 1, computing environment 100 may include one or more client devices 102, 104, and/or 106, also referred to as user devices, which can allow users to connect over network 150 to access online service 110, which may execute on a network computing and/or server system. Online service 110 may include and/or communicate with one or more data store(s) 112, which may be configured to store and maintain a corpus of content items 114, which may include any type of digital content, such as digital images, videos, documents, etc. Online service 110 may form at least a portion of a social media platform or environment, a networking platform or environment, an e-commerce platform or environment, or any other form of interactive computing. According to exemplary implementations, content items included in corpus of content items 114 may include links, identifiers, and/or other associations to other content pages, such as webpages. Accordingly, users and subscribers of online service 110 may access such other content pages via the links, identifiers, and/or other associations included in the content items of corpus of content items 114.

Client devices 102, 104, 106 and/or online service 110 may communicate via wired and/or wireless connections to network 150. Client devices 102, 104, and/or 106 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 102. 104, and/or 106 and online service 110.

As illustrated in FIG. 1, users associated with client devices 102, 104, and/or 106 may access online service 110 via network 150 to search for, consume, browse, or otherwise access content items, such as content items included in corpus of content items 114. According to embodiments of the present disclosure, client devices 102, 104, and/or 106 may access and/or interact with online service 110 through network 150 via one or more applications operating and/or executing on client devices 102, 104, and/or 106. For example, users associated with client devices 102, 104, and/or 106 may launch and/or execute such an application on client devices 102, 104, and/or 106 to access and/or interact with online service 110 through network 150. According to aspects of the present disclosure, a user may, via execution of the application on client devices 102, 104, and/or 106, access or log into online service 110 by submitting one or more credentials (e.g., username/password, biometrics, secure token, etc.) through a user interface presented on client devices 102, 104, and/or 106. The credentials provided by the users may be verified by online service 110.

Once logged into online service 110, the user associated with one of client devices 102, 104, and/or 106 may submit a request for content items, access, and/or otherwise consume content items hosted and maintained by online service 110. For example, the request for content items may be included in a query (e.g., a text-based query, an image query, etc.) a request to access a homepage and/or home feed, a request for recommended content items, and the like. Alternatively and/or in addition, online service 110 may push content items to client devices 102, 104, and/or 106. For example, online service 110 may push content items to client devices 102, 104, and/or 106 on a periodic basis, after a certain time has elapsed, based on activity associated with client devices 102, 104, and/or 106 and online service 110, upon identification of relevant and/or recommended content items that may be provided to client devices 102, 104, and/or 106, and the like.

Further, content items included in corpus of content items 114 may include links, identifiers, and/or other associations to other content pages, such as webpages, which may be accessed, via client devices 102, 104, and/or 106, via the links, identifiers, and/or other associations included in the content items of corpus of content items 114. Such linked and/or otherwise associated content pages may include spamming, malicious, and/or otherwise undesirable content that users and/or subscribers of online service 110 may want to avoid. Accordingly, online service 110 may include a spam detection engine, which may be configured to determine whether any such linked and/or associated content pages may include spamming, malicious, and/or otherwise undesirable content. According to exemplary embodiments of the present disclosure, the spam detection engine may crawl, scrape, and/or parse one or more linked content pages to obtain various information associated with the text, media, and/or structure of such linked and/or associated content pages. The spam detection engine may configured to process the various information associated with the text, media, and/or structure of the content page to generate certain textual, media, and/or structural features, and determine, based on the textual, media, and/or structural features, whether the linked and/or associated content page includes spamming, malicious, and/or otherwise undesirable content. An exemplary spam detection engine is described in further detail herein at least in connection with FIG. 2. In the event that the spam detection engine determines that the linked and/or associated content page includes spamming, malicious, and/or otherwise undesirable content, certain remediation actions may be taken by online service 110. For example, a warning may be displayed to the user trying to access the linked and/or associated content page, access to the linked and/or associated content page may be blocked, identification of the linked and/or associated content page as spamming, malicious, and/or otherwise undesirable content may be stored in a datastore, and the like.

Figure 2:
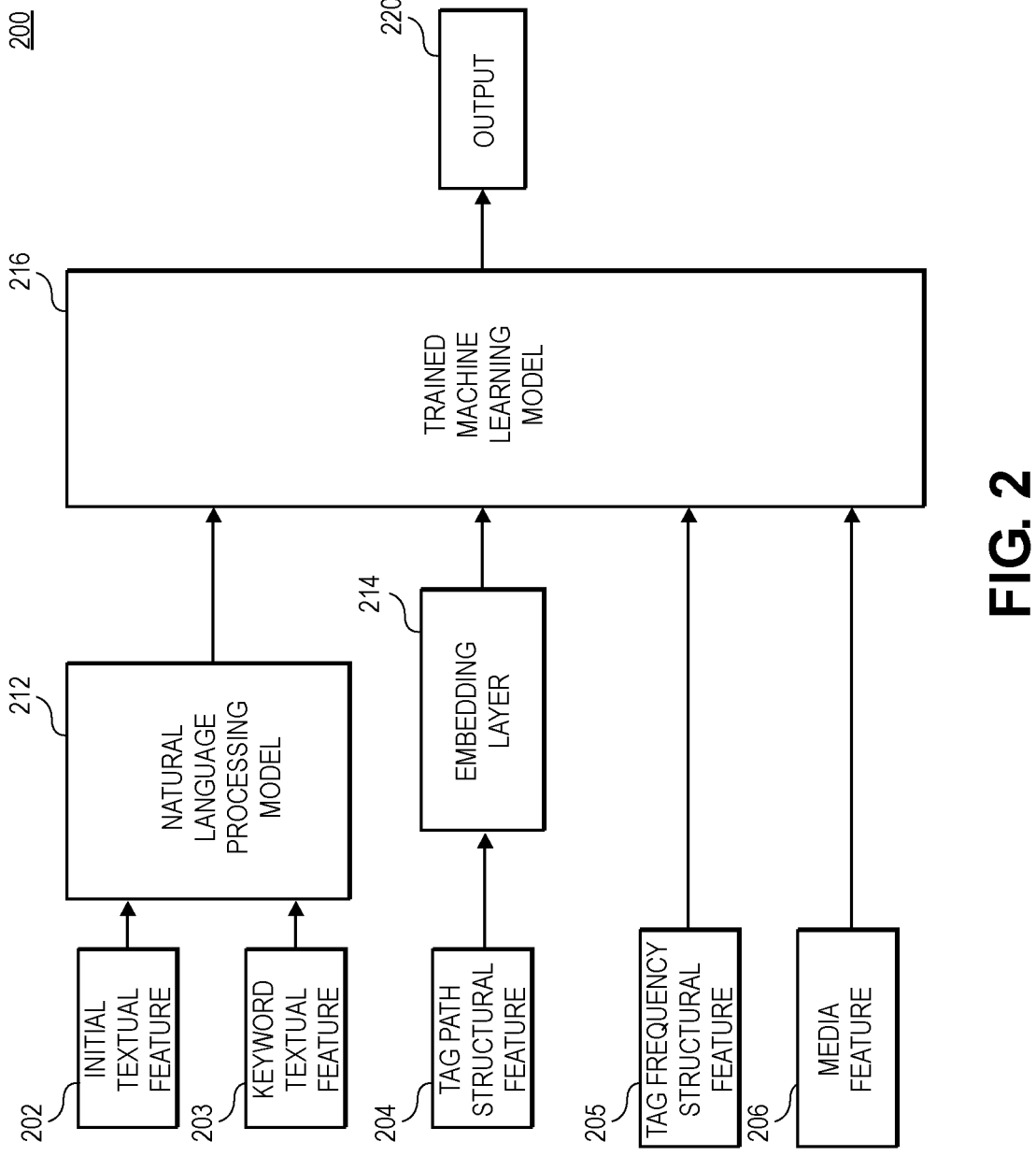
FIG. 2 is a block diagram of an exemplary spam detection engine, according to exemplary embodiments of the present disclosure.

FIG. 2 is a block diagram of an exemplary spam detection engine, according to exemplary embodiments of the present disclosure.

As shown in FIG. 2, exemplary spam detection engine 200 may include natural language processing model 212, embedding layer 214, and trained machine learning model 216. According to exemplary embodiments of the present disclosure, natural language processing model 212 may include a trained multi-lingual distil-bidirectional encoder representations from transformers (distil-BERT) type model, embedding layer 214 can include a trained embedding vector generator configured to generate an embedding vector representative of the input data, and trained machine learning model 216 may include one or more neural networks (e.g., a deep neural network, a multi-layer perceptron network (MLP), etc.) trained to determine whether a linked and/or otherwise associated content page (e.g., a webpage, etc.) includes spamming, malicious, and/or otherwise undesirable content.

In exemplary implementations of the present disclosure, an online service (e.g., online service 110) may employ exemplary spam detection engine 200 to detect and determine whether a linked content page may include spamming, malicious, and/or otherwise undesirable content. For example, various information associated with the linked content page may first be determined. The information may be obtained by crawling, scraping, and/or parsing content pages associated with links, etc. The obtained information may be related to textual content, media content, and/or structural content associated with the linked content page and may be used to generate various features, which may be provided to and processed by spam detection engine 200 in detecting and/or determining whether the linked content page includes spamming, malicious, and/or otherwise undesirable content.

In the exemplary implementation illustrated in FIG. 2, the one or more inputs provided to spam detection engine 200 may include textual features corresponding to text included in the linked content page, media features corresponding to media items included in the linked content page, and/or structural features corresponding to the structure of the linked content page. As shown in FIG. 2, the various features may include initial textual feature 202, keyword textual feature 203, tag path structural feature 204, tag frequency structural feature 205, and media feature 206.

According to aspects of the present disclosure, initial textual feature 202 may correspond to an initial portion of the text included in the linked content page and keyword textual feature 203 may correspond to keywords included in the linked content page. For example, initial textual feature 202 may include a tokenization of an initial predetermined number of tokens (e.g., the first 25 tokens, the first 50 tokens, the first 100 tokens, the first 200 tokens, the first 500 tokens, etc.) of the text included in the linked content page, and keyword textual feature 203 may include a sampling of weighted keywords extracted from the linked content page. Determination and generation of initial textual feature 202 and keyword textual feature 203 are discussed in further detail herein at least in connection with FIG. 4.

In addition to initial textual feature 202 and keyword textual feature 203, spam detection engine 200 may also process media feature 206 as an input. Media feature 206 may correspond to a frequency that a media item included in the linked content page is included in other content pages (e.g., webpages, etc.). A media item appearing in a large number of other content pages can be an indication of whether a content page may include spamming, malicious, and/or otherwise undesirable content. For example, a media item appearing on and/or included in a relatively high number of other content pages may indicate a greater likelihood that the media item in question may be associated with spamming, malicious, and/or otherwise undesirable content pages when compared to content pages including media items that appear in a relatively few number of other content pages. Determination and generation of media feature 206 are discussed in further detail herein at least in connection with FIG. 5.

As illustrated in FIG. 2, spam detection engine 200 may also obtain and process tag path structural feature 204 and tag frequency structural feature 205 in determining whether a linked content page may include spamming, malicious, and/or otherwise undesirable content. For example, a document object model (DOM) associated with the linked content page may be analyzed to determine the structure of the linked content page. In exemplary implementations where the linked content page is coded in a markup language (e.g., hypertext markup language (HTML), extensible markup language (XML), and the like), the structure (e.g., tags, etc.) of the linked content page may be identified and extracted from the DOM to generate the tag path structural feature 204 and tag frequency structural feature 205. For example, tag path structural feature 204 may correspond to certain tag paths (or sub-paths) in the structure of the linked content page, and tag frequency structural feature 205 may correspond to a frequency of certain tags appearing in the DOM of the linked content page. Determination and generation of tag path structural feature 204 and tag frequency structural feature 205 are discussed in further detail herein at least in connection with FIG. 6.

As shown in FIG. 2, initial textual feature 202 and keyword textual feature 203 may be processed by natural language processing model 212 (e.g., a trained multi-lingual distilled BERT model, or other natural language processing system) to generate one or more embeddings and/or vectors that are representative of initial textual feature 202 and keyword textual feature 203. Similarly, tag path structural feature 204 may be processed by embedding layer 214 to generate one or more embeddings and/or vectors that are representative of tag path structural feature 204. Accordingly, the embeddings and/or vectors generated by natural language processing model 212 and embedding layer 214, along with tag frequency structural feature 205 and media feature 206 may be processed by trained machine learning model 216, which may determine and/or detect, based on initial textual feature 202, keyword textual feature 203, tag path structural feature 204, tag frequency structural feature 205, and media feature 206, whether the linked content page includes spamming, malicious, and/or otherwise undesirable content, and generate output 220, which may indicate whether the linked content page includes spamming, malicious, and/or otherwise undesirable content.

Figure 3:
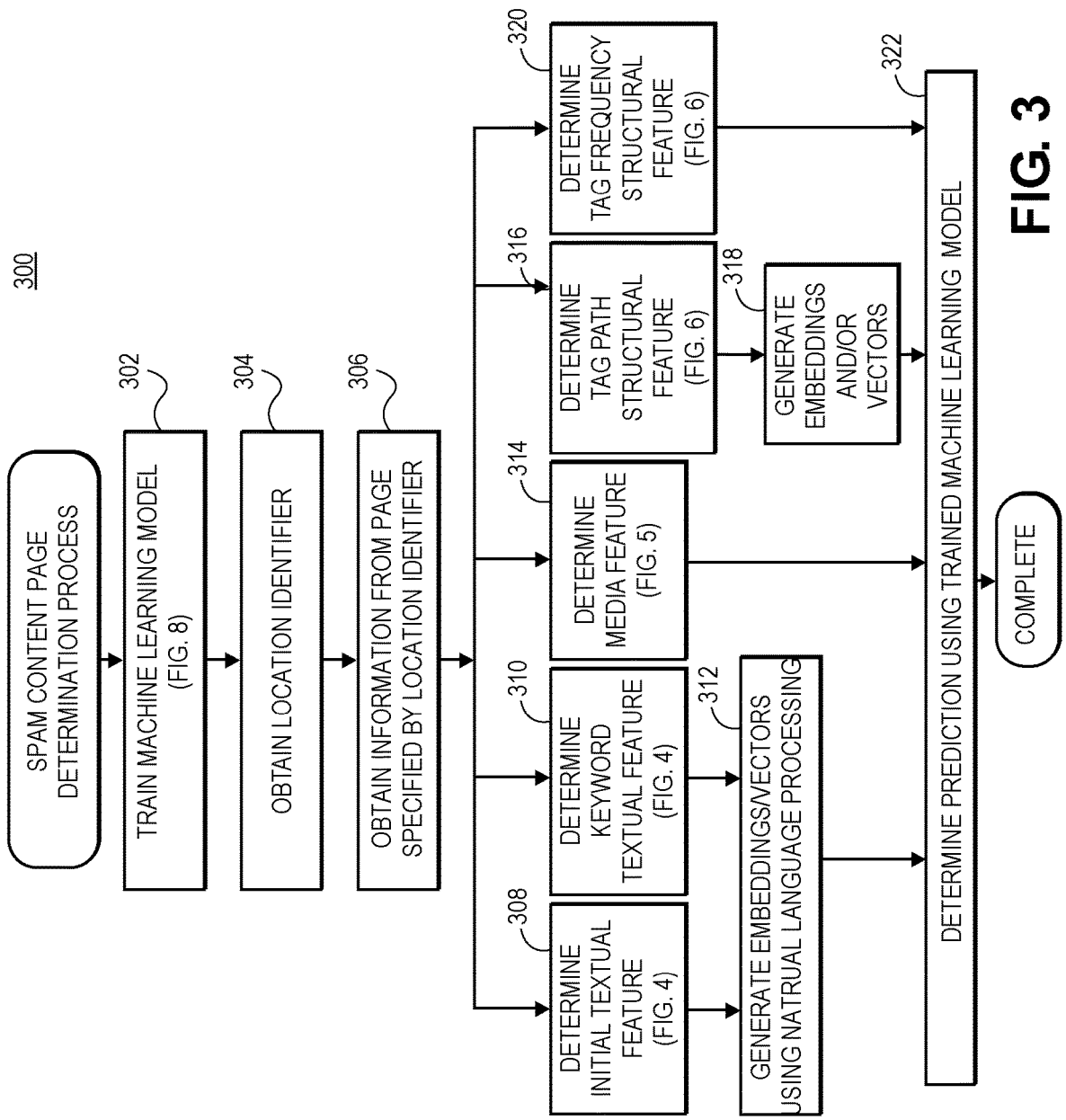
FIG. 3 is a flow diagram illustrating an exemplary spam content page determination process, according to exemplary embodiments of the present disclosure.

FIG. 3 is a flow diagram illustrating an exemplary spam content page determination process, according to exemplary embodiments of the present disclosure.

As shown in FIG. 3, spam content page determination process 300 may begin with training of a machine learning model (e.g., trained machine learning model 216), as in step 302. The training of the machine learning model is described in further detail herein at least in connection with FIG. 8.

In step 304, a location identifier for a content page may be obtained. According to exemplary embodiments of the present disclosure, the location identifier may include a link (e.g., uniform resource locator (URL), etc.) or other identifier indicating a location of or association to a content page. According to certain aspects, the location identifier may be associated with a content item that may be hosted and maintained by an online service.

After obtaining of the location identifier associated with a linked content page, information from the content page associated with the location identifier may be obtained, as in step 306. This may be performed, for example, via a crawler, scraper, parser, and/or the like, and may include extracting information related to the text, media, structure, etc. of the content page associated with the location identifier. In exemplary implementations, the textual information extracted from the content page may include information associated with a title of the content page, a description of the content page, a body of the content page, and the like, and may include extraction of at least a portion of the text included in the content page and/or keywords identified in the text included in the content page. The media information extracted from the content page may include information in connection with any media (e.g., digital images, videos, etc.) included in the content page. And the structural information extracted from the content page may include a document model object (DOM) type tree structure which may define the structure (e.g., tags, tag paths, etc.) of the content page.

Based on the textual, media, and/or structural information extracted from the content page, certain textual, media, and/or structural features may be determined and/or generated. As shown in FIG. 3, an initial textual feature may be determined, as in step 308, a keyword textual feature may be determined, as in step 310, a media feature may be determined, as in step 314, a tag path structural feature may be determined, as in step 316, and a tag frequency structural feature may be determined, as in step 320. Determination and/or generation of these features is described in further detail herein at least in connection with FIGS. 4-6.

In step 312, the initial textual feature and the keyword textual feature may be processed using a natural language processing engine to generate one or more embeddings and/or vectors, which may be representative of the initial textual feature and the keyword textual feature. According to exemplary implementations of the present disclosure, the natural language processing engine may include a multi-lingual distilled BERT model. Alternatively and/or in addition, other natural language processing methods may be employed. Similarly, embeddings and/or vectors, which may be representative of the tag path structural feature may be generated, as in step 318.

The embeddings and/or vectors generated from the initial textual feature, the keyword textual feature, and the tag path structural feature, along with the media feature and the tag frequency structural feature, may be processed by a trained machine learning model to determine a prediction of whether the linked content page includes spamming, malicious, and/or otherwise undesirable content, as in step 322.

FIG. 4 is a flow diagram illustrating an exemplary text feature determination process, according to exemplary embodiments of the present disclosure.

As shown in FIG. 4, text feature determination process 400 may begin with extraction of textual information associated with a linked content page, as in step 402. In exemplary implementations of the present disclosure, the textual information extracted from the linked content page may be associated with various sources of text from the linked content page. For the example, the textual information may be extracted by scraping and parsing (e.g., using beautiful soup, etc.) the textual information included on the content page. The extracted textual information may include text associated with a title of the linked content page, text associated with a description of the linked content page, text associated with the body of the linked content page, and the like.

Text feature determination process 400 can facilitate determination of one or more textual features that may be used in determining whether the content page includes spamming, malicious, and/or otherwise undesirable content based on the extracted textual information. For example, an initial textual feature and a keyword textual feature may be determined based on the extracted textual information.

In connection with determining the initial textual feature, a first N-number of tokens in the extracted textual information may be determined and tokenized, as in step 404. The number of tokens that are tokenized in the determination of the initial textual feature may include any predetermined number of tokens (e.g., the first 25 tokens, the first 50 tokens, the first 100 tokens, the first 200 tokens, the first 500 tokens, etc.). Further, determination of the first N-number of tokens may be independent of the source (e.g., title, description, metadata, body, etc.) of the text and may have multi-lingual support. The tokenized text may be provided as the initial textual feature, as in step 406.

Alternatively and/or in addition, text feature determination process 400 can also facilitate determination of a keyword textual feature. In this regard, the extracted text from the various sources (e.g., title, description, metadata, body, etc.) may be processed separately. Accordingly, in step 408, keywords from each of the various sources may be parsed and identified separately. For example, keywords may be separately identified from the title portion of the linked content page, the description portion of the linked content page, the body of the linked content page, and the like. For each of the identified keywords, a score/weight may be determined and associated with each identified keyword, as in step 410. According to exemplary implementations of the present disclosure, the score/weight associated with each keyword may correspond to a term frequency inverse document frequency (TF-IDF) measure, and may be determined in accordance with:

$$score(v,D)=TF(v,D)*IDF(v)$$

where score (v,D) can represent the score of token v appearing in text snippet D, TF (v,D) can represent the term frequency of token v appearing in text snippet D, and IDF (v) can represent the inverse document frequency of token v. The term frequency of token v appearing in text snippet D can be represented as:

$$TF(v, D) = \frac{f(v, D)*(k+1)}{f(v, D)+k*\left(1-b+b\frac{|D|}{avgdl}\right)}$$

where f(v,D) can represent a raw frequency count of token v, which can be normalized with the parameters |D|, and avgdl, where |D| can represent an estimated document length and avgdl can represent an average document length and hyperparameters k and b. Further, the inverse document frequency of token v can be represented as:

$$IDF(v) = \ln c\frac{N-cdf(v)+0.5}{cdf(v)+0.5}$$

cdf(v) can represent a canonical version of a document frequency of token v across content pages N which have been crawled, and where:

$$cdf(v) = \sum_{v' \in C(v)} df(v')$$

where C(v) includes all tokens that share the same canonical ID with token v.

After the scores/weights have been determined for keywords from each source, keywords may be selected according to the determined scores/weights, as in step 412, to identify and/or extract segments from the extracted textual information. For example, the keywords may be sorted according to the determined scores/weights, and the keywords with the highest scores/weights may be selected. The number of keywords that are selected may be based on a predetermined token length (e.g., 25 tokens, 50 tokens, 100 tokens, 200 tokens, 500 tokens, etc.). In step 414, the identified segments (e.g., based on the selected keywords)

may be concatenated, while preserving the order in which the keywords and/or segments appeared in the content page, and the concatenated segments may be tokenized. The tokenized segments may then be provided as the keyword textual feature (as in step 416).

Figure 5:
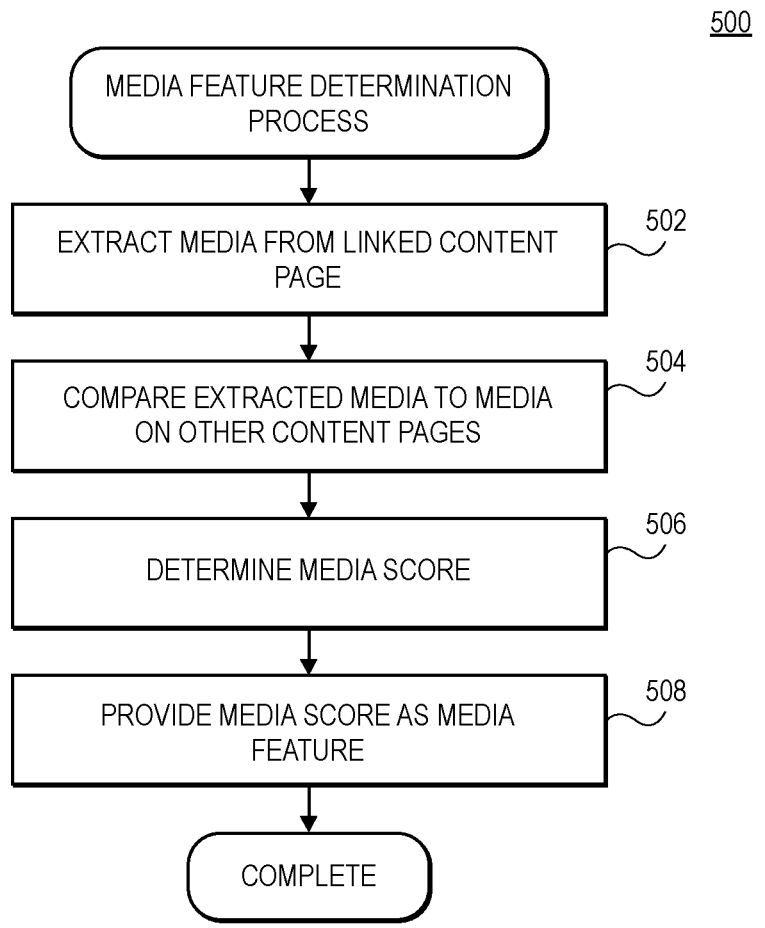
FIG. 5 is a flow diagram illustrating an exemplary media feature determination process, according to exemplary embodiments of the present disclosure.

FIG. 5 is a flow diagram illustrating an exemplary media feature determination process, according to exemplary embodiments of the present disclosure.

As shown in FIG. 5, media determination process 500 may begin with extraction of media information associated with a linked content page, as in step 502. In exemplary implementations of the present disclosure, the media information extracted from the linked content page may be associated with various sources of media (e.g., digital images, videos, etc.) included the linked content page. For the example, the media information may be extracted by scraping the media included on the content page and can include information such as signatures, digital fingerprints, annotations, classifications, embeddings, metadata, etc. associated with the media included on the content page.

The extracted media information may be compared to media included on other pages to determine whether (and how frequently) the media included in the content page is included in other content pages, as in step 504. Based on the comparison with other content pages, a media score may be determined in connection with the media included on the content page, as in step 506. According to exemplary implementations of the present disclosure, the media score may be determined in accordance with:

$$\text{media\_score } (p) = 1.0 - \frac{\text{unique } (p)}{\text{all } (p)}$$

where p can represent the content page being analyzed, unique (p) can represent the number of images that are only included on content page p, and all (p) can represent the number of media appearing on content page p. In step 508, the media score may be provided as the media feature.

FIG. 6 is a flow diagram illustrating an exemplary structural feature determination process, according to exemplary embodiments of the present disclosure.

As shown in FIG. 6, structural feature determination process 600 may begin with extraction of structural information associated with a linked content page, as in step 602. In exemplary implementations of the present disclosure, extraction of the structural information associated with the linked content page may include obtaining a DOM tree representing the structure of the linked content page.

Structural feature determination process 600 can facilitate determination of one or more structural features that may be used in determining whether the content page includes spamming, malicious, and/or otherwise undesirable content based on the extracted structural information. For example, a tag path structural feature and a tag frequency structural feature may be determined based on the extracted structural information.

In connection with determining the tag path structural feature, tag paths comprising the structure of the linked content page may first be determined and/or identified, as in step 604. For example, a search algorithm may be employed to traverse the DOM tree structure associated with the linked content page to identify and determine tag paths associated with the linked content page. After the paths of the linked content page have been identified, the paths may be divided into sub-paths, as in step 606. For example, the paths of the linked content page may be divided into sub-paths having a predetermined number of tags (e.g., 2 tags, 3 tags, 4 tags, 5 tags, etc.). According to certain aspects of the present disclosure, certain tags (e.g., the <div> tags, etc.) may be filtered prior to and/or after identification of the tag paths and/or sub-paths. In step 608, the sub-paths may be grouped into groups based on the depth of the starting tag of each sub-path. For example, sub-paths having a starting tag with a depth within a first range may be assigned to a first group, sub-paths having a starting tag with a depth within a second range may be assigned to a second group, sub-paths having a starting tag with a depth within a third range may be assigned to a third group, and so on.

According to an exemplary implementation, the sub-paths may be grouped into three groups of sub-paths, with the first group having a starting tag depth between and including zero and four, the second group having a starting tag depth between and including five and nine, and the third group having a starting tag depth greater than or equal to ten. Further, the number of sub-paths in each group may be limited to a group limit (e.g., 10 sub-paths, 20 sub-paths, 30 sub-paths, 50 sub-paths, etc.), which can limit each group to a predefined number of the most frequent sub-paths.

Each sub-path can be considered to be a token, and in step 610, an embedding may be generated for each sub-path (e.g., using a word embedding technique, etc.). Accordingly, each group may comprise an embedding for each sub-path included in the respective group. In step 612, the embeddings can be aggregated. For example, the embeddings associated with each respective group may be averaged to obtain an averaged embedding for each group, and the average embeddings may be concatenated to generate an aggregated/overall embedding/vector that is representative of the sub-paths. The aggregated/overall embedding/vector can be provided as the tag path structural feature, as in step 614.

Alternatively and/or in addition, structural feature determination process 600 can facilitate determination of a tag frequency structural feature. In this regard, the extracted structural information may be processed to extract the tags included in the linked content page, as in step 616. Optionally, certain tags (e.g., <div> tags, and the like) may be filtered and/or removed from the tags extracted from the linked content page. In step 618, a frequency of each of the tags may be determined. The tag frequency may correspond to a number of times a particular tag is included in the content page relative to the total number of tags included in the content page. According to certain aspects of the present disclosure, the tag frequency may correspond to a normalized ratio tag frequency ratio, which can include a normalized ratio of a number of times a particular tag appears to a total number of tags. In step 620, the normalized tag frequency ratios may be provided as the tag frequency structural feature.

Figure 7:
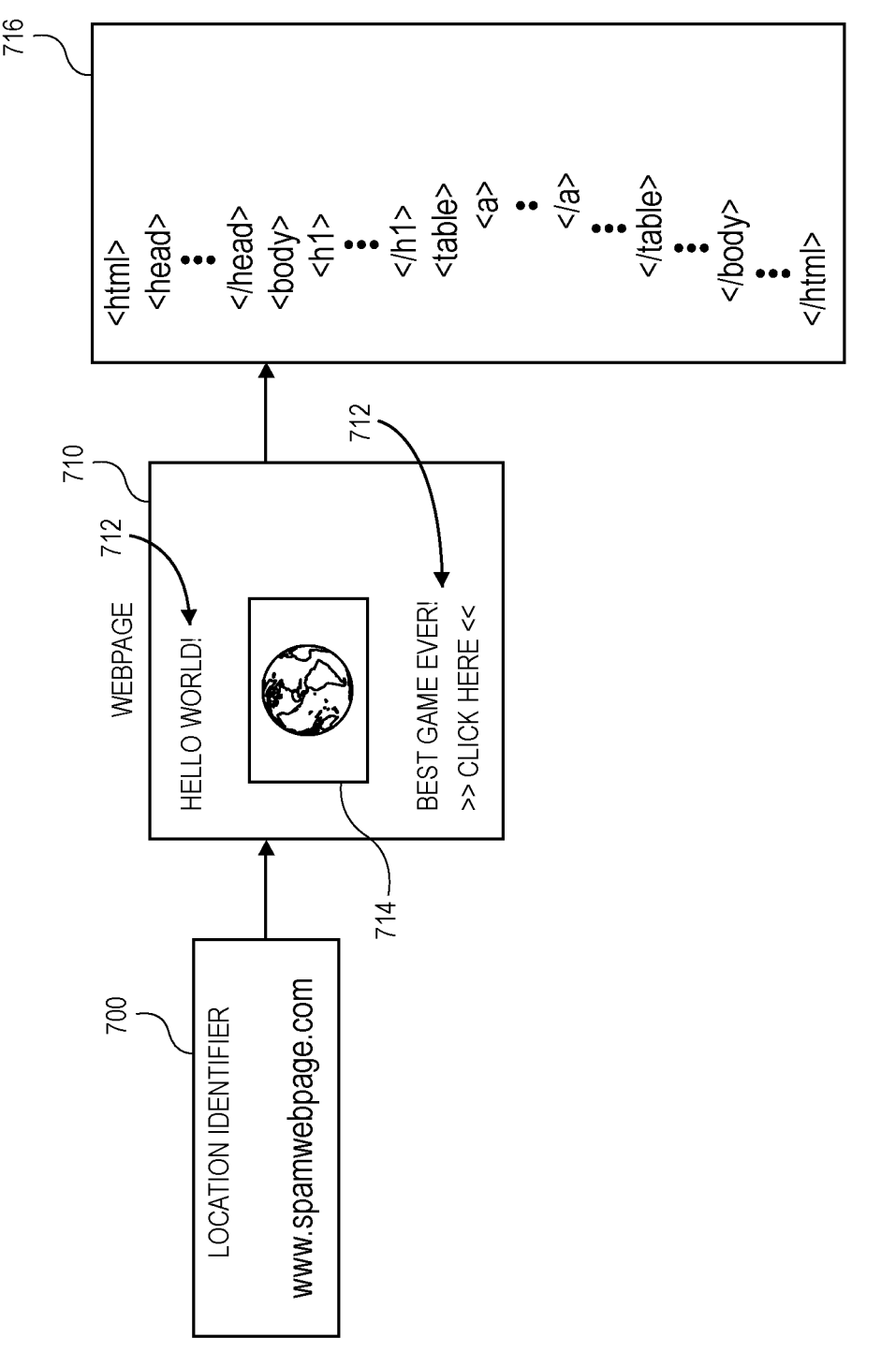
FIG. 7 is a block diagram illustrating an exemplary location identifier and content page, according to exemplary embodiments of the present disclosure.

FIG. 7 is a block diagram illustrating an exemplary location identifier and content page, according to exemplary embodiments of the present disclosure.

In the exemplary implementation illustrated in FIG. 7, location identifier 700 may indicate the location of a content page, such as webpage 710. According to exemplary embodiments of the present disclosure, location identifier 700 may be associated with a content item hosted and maintained by an online service, and webpage 710 may be crawled, scraped, and/or parsed to extract various information associated with the text, media items, and/or structure of webpage 710, to determine whether webpage 710 page includes spamming, malicious, and/or otherwise undesirable content.

As shown in FIG. 7, location identifier 700 may include a link, such as a URL, that specifies that location of a content page, such as webpage 710. Further, webpage 710 may include text content 712, media content 714, and structure 716. Accordingly, information associated with text content 712, media content 714, and structure 716 may be extracted and processed according to exemplary embodiments of the present disclosure (e.g., by spam detection engine 200) to determine whether webpage 710 may include spamming, malicious, and/or otherwise undesirable content. For example, text content 712 may be extracted and processed to generate textual features (e.g., an initial textual feature and a keyword textual feature, etc.), media content 714 may be extracted and processed to generate media features (e.g., a media feature), and structure 716 may be extracted and processed to generate structural features (e.g., a tag path structural feature and a tag frequency structural feature). The textual features, media features, and structural features may be processed by a trained machine learning model to determine a prediction of whether webpage 710 includes spamming, malicious, and/or otherwise undesirable content.

FIG. 8 is a flow diagram of an exemplary training process 800 and an exemplary updating process 850 for training a DNN (e.g., MLP, or other machine learning model), according to exemplary embodiments of the present disclosure.

As shown in FIG. 8, training process 800 is configured to train an untrained DNN 834 operating on computer system 840 to transform untrained DNN 834 into trained DNN 836 that operates on the same or another computer system, such as online service 110. In the course of training, as shown in FIG. 8, at step 802, untrained DNN 834 is initialized with training criteria 830. Training criteria 830 may include, but is not limited to, information as to a type of training, number of layers to be trained, candidate labels, etc.

At step 804 of training process 800, corpus of labeled training data 832, may be accessed. For example, if training is to generate a trained DNN that predicts whether a linked content page includes spamming, malicious, and/or otherwise undesirable content, labeled training data 832 may include labeled content pages including spamming, malicious, and/or otherwise undesirable content, and preferably includes content pages from low-cardinality domains (e.g., domains with fewer than a certain number of links).

The disclosed implementations discuss the use of labeled training data, meaning that the actual results of processing of the data items of corpus of training data 832 (i.e., whether the data corresponds to a positive or negative presence of a condition) are known. Of course, in various implementations, the training data 832 may also or alternatively include unlabeled training data.

With training data 832 accessed, at step 806, training data 832 may be divided into training and validation sets. Generally speaking, the items of data in the training set are used to train untrained DNN 834 and the items of data in the validation set are used to validate the training of the DNN. As those skilled in the art will appreciate, and as described below in regard to much of the remainder of training process 800, there are numerous iterations of training and validation that occur during the training of the DNN.

At step 808 of training process 800, the data items of the training set are processed, often in an iterative manner. Processing the data items of the training set includes capturing the processed results. After processing the items of the training set, at step 810, the aggregated results of processing the training set are evaluated, and at step 812, a determination is made as to whether a desired performance has been achieved. If the desired performance is not achieved, in step 814, aspects of the DNN are updated in an effort to guide the DNN to generate more accurate results, and processing returns to step 806, where a new set of training data is selected, and the process repeats. Alternatively, if the desired performance is achieved, training process 800 advances to step 816.

At step 816, and much like step 808, the data items of the validation set are processed, and at step 818, the processing performance of this validation set is aggregated and evaluated. At step 820, a determination is made as to whether a desired performance, in processing the validation set, has been achieved. If the desired performance is not achieved, in step 814, aspects of the DNN are updated in an effort to guide the machine learning model to generate more accurate results, and processing returns to step 806. Alternatively, if the desired performance is achieved, the training process 800 advances to step 822.

At step 822, a finalized, trained DNN 836 is generated for determining a prediction of whether a content page includes spamming, malicious, and/or otherwise undesirable content. Typically, though not exclusively, as part of finalizing the now-trained DNN 836, portions of the DNN that are included in the model during training for training purposes are extracted, thereby generating a more efficient trained DNN 836.

As shown in FIG. 8, after trained DNN 836 has been finalized, DNN 836 may continue to be updated, in accordance with exemplary updating process 850. According to exemplary embodiments of the present disclosure, actual performance of DNN 836 may be continuously monitored, in step 852, and in step 854, it can be determined whether a desired performance has been achieved. If a desired performance has not been achieved, further training data may be generated, as in step 856, and the DNN may be updated with the further training data, as in 858.

Figures 9, 10:
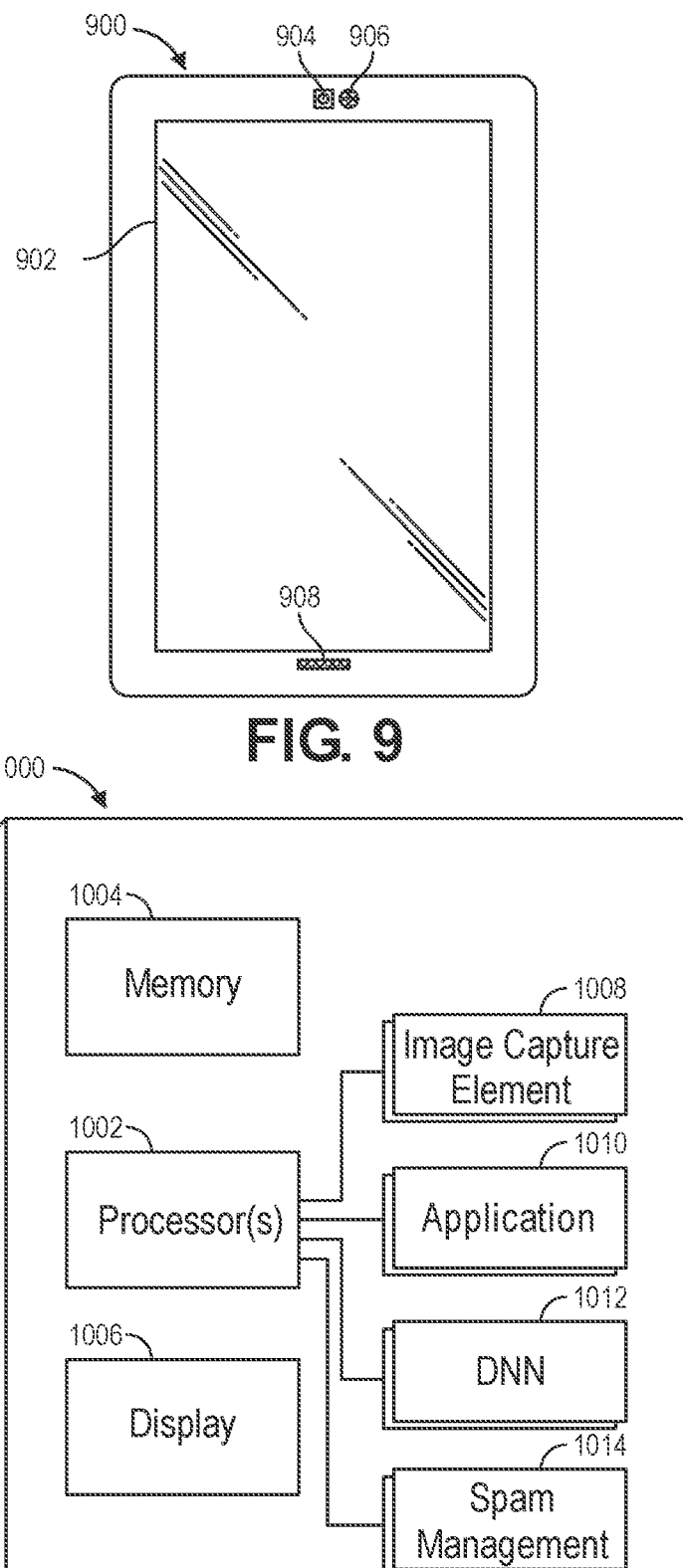
FIG. 9 illustrates an example user device, in accordance with disclosed implementations.
FIG. 10 illustrates an example configuration of components of a user device, such as that illustrated in FIG. 9.

FIG. 9 illustrates an example user device 900 that can be used in accordance with various implementations described herein. In this example, the user device 900 includes a display 902 and optionally at least one input component 904, such as a camera, on a same side and/or opposite side of the device as the display 902. The user device 900 may also include an audio transducer, such as a speaker 906, and optionally a microphone 908. Generally, the user device 900 may have any form of input/output components that allow a user to interact with the user device 900. For example, the various input components for enabling user interaction with the device may include a touch-based display 902 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a user device or otherwise in communication with the user device. Various other input components and combinations of input components can be used as well within the scope of the various implementations as should be apparent in light of the teachings and suggestions contained herein.

In order to provide the various functionality described herein, FIG. 10 illustrates an example set of basic components 1000 of a user device, such as the user device 900 described with respect to FIG. 9 and discussed herein. In this example, the device includes one or more processors 1002 for executing instructions that can be stored in at least one memory device or element 1004. As would be apparent to one of ordinary skill in the art, the device can include many types of memory, data storage or computer-readable storage media, such as a first data storage for program instruction for execution by the one or more processors 1002. Removable storage memory can be available for sharing information with other devices, etc. The device typically will include some type of display 1006, such as a touch-based display, electronic ink (e-ink), organic light emitting diode (OLED), liquid crystal display (LCD), etc.

The device may include at least one image capture element 1008, such as one or more cameras that are able to capture images of objects in the vicinity of the device. An image capture element can include, or be based at least in part upon, any appropriate technology, such as a CCD or CMOS image capture element having a determined resolution, focal range, viewable area, and capture rate. The device can include at least one application component 1010 for performing the implementations discussed herein. The user device may be in constant or intermittent communication with one or more remote computing resources and may exchange information, such as content items, linked content pages, determinations of whether linked content page includes spamming, malicious, and/or otherwise undesirable content, metadata, updated DNNs, etc., with the remote computing system(s) as part of the disclosed implementations.

The user device may also include DNN 1012, as discussed herein, that is operable to receive certain features (e.g., textual features, media features, and/or structural features) and determine whether a linked content page includes spamming, malicious, and/or otherwise undesirable content. Likewise, the user device may also include a spam management component 1014 that maintains, for example, an index of content pages already identified as including spamming, malicious, and/or otherwise undesirable content, etc., and/or performs some or all of the implementations discussed herein.

The example user device may also include at least one additional input device able to receive conventional input from a user. This conventional input can include, for example, a push button, touch pad, touch-based display, wheel, joystick, keyboard, mouse, trackball, keypad or any other such device or element whereby a user can submit an input to the device. These I/O devices could be connected by a wireless, infrared, Bluetooth, or other link as well in some implementations. In some implementations, however, such a device might not include any buttons at all and might be controlled only through touch inputs (e.g., touch-based display), audio inputs (e.g., spoken), or a combination thereof.

Figure 11:
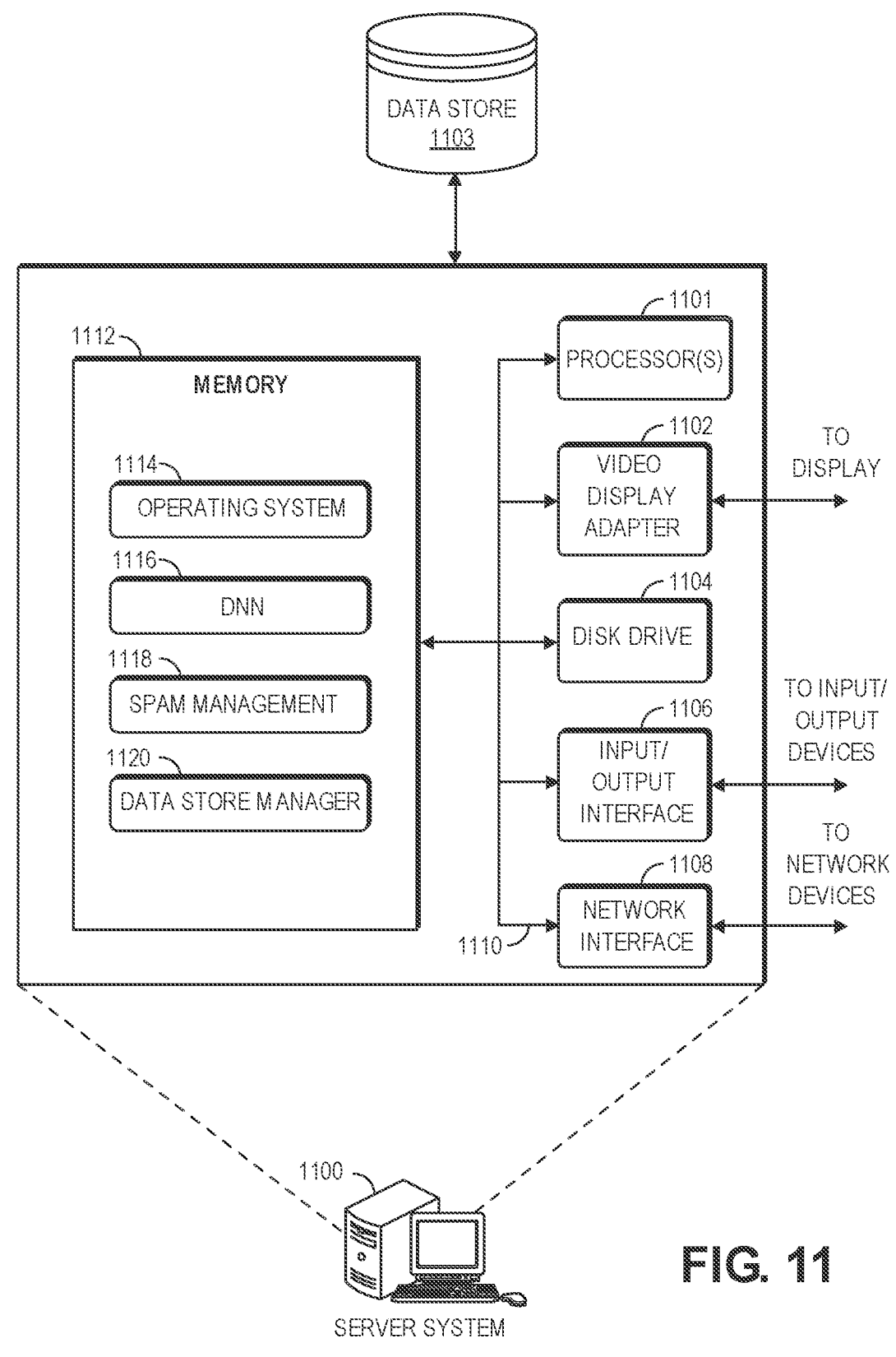
FIG. 11 is a pictorial diagram of an illustrative implementation of a server system that may be used for various implementations.

FIG. 11 is a pictorial diagram of an illustrative implementation of a server system 1100, such as a remote computing resource, that may be used with one or more of the implementations described herein. The server system 1100 may include one or more processors 1101, such as one or more redundant processors, a video display adapter 1102, a disk drive 1104, an input/output interface 1106, a network interface 1108, and a memory 1112. The processor(s) 1101, the video display adapter 1102, the disk drive 1104, the input/output interface 1106, the network interface 1108, and the memory 1112 may be communicatively coupled to each other by a communication bus 1110.

The video display adapter 1102 provides display signals to a local display permitting an operator of the server system 1100 to monitor and configure operation of the server system 1100. The input/output interface 1106 likewise communicates with external input/output devices not shown in FIG.

11, such as a mouse, keyboard, scanner, or other input and output devices that can be operated by an operator of the server system 1100. The network interface 1108 includes hardware, software, or any combination thereof, to communicate with other computing devices. For example, the network interface 1108 may be configured to provide communications between the server system 1100 and other computing devices, such as the user device 900.

The memory 1112 generally comprises random access memory (RAM), read-only memory (ROM), flash memory, and/or other volatile or permanent memory. The memory 1112 is shown storing an operating system 1114 for controlling the operation of the server system 1100. The server system 1100 may also include a trained DNN 1116, as discussed herein. In some implementations, the DNN may determine whether linked content pages include spamming, malicious, and/or otherwise undesirable content. In other implementations, the DNN 1012 (FIG. 10) may determine whether linked content pages include spamming, malicious, and/or otherwise undesirable content on a user device. In still other examples, a DNN may exist on both the server and each user device.

The memory 1112 additionally stores program code and data for providing network services that allow user device 900 and external sources to exchange information and data files with the server system 1100. The memory 1112 may also include a spam management application 1118 that maintains spam and/or spam information for different users that utilize the disclosed implementations. The spam management application 1118 may communicate with a data store manager application 1120 to facilitate data exchange and mapping between the data store 1103, user devices, such as the user device 900, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1100 can include any appropriate hardware and software for integrating with the data store 1103 as needed to execute aspects of one or more applications for the user device 900, the external sources, etc.

The data store 1103 can include several separate data tables, databases or other data storage mechanisms and media for storing data relating to a particular aspect. For example, the data store 1103 may include an index of linked content pages that include spamming, malicious, and/or otherwise undesirable content, features (e.g., textual features, media features, structural features, etc.) and/or information (e.g., textual information, media information, structural information, etc.), media items, content items, etc. associated with linked content pages, and the like. User information and/or other information may likewise be stored in the data store.

It should be understood that there can be many other aspects that may be stored in the data store 1103, which can be stored in any of the above listed mechanisms as appropriate or in additional mechanisms of any of the data store. The data store 1103 may be operable, through logic associated therewith, to receive instructions from the server system 1100 and obtain, update or otherwise process data in response thereto.

The server system 1100, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure described herein, including but not limited to the flow charts shown in FIGS. 3-6 and 8, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Aspects of the disclosed system may be implemented as a computer method or as an article of manufacture, such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed:

1. A computing system, comprising:

one or more processors;

a memory storing program instructions that, when executed by the one or more processors, cause the one or more processors to at least:

determine, based at least in part on a plurality of tag paths defining a structure of a content page, a first structural feature associated with the content page, wherein determining the first structural feature comprises:

obtaining a document object model (DOM) tree representing the structure of the content page;

traversing the DOM tree to identify a plurality of sub-paths from the plurality of tag paths within the DOM tree;

grouping the plurality of sub-paths into a plurality of sub-path groups, wherein each sub-path group specifies a starting tag depth range and comprises a subset of the plurality of sub-paths having a starting tag within the corresponding tag depth range;

generating, for each of the plurality of sub-path groups, a corresponding embedding; and aggregating the corresponding embeddings for each of the plurality of sub-path groups to generate the first structural feature;

determine, based at least in part on a tag frequency of a plurality of tags defining the structure of the content page, a second structural feature associated with the content page; and determine, using a trained machine learning model, that the content page includes spamming content based at least in part on the aggregated embedding for first structural feature and the second structural feature.

2. The computing system of claim 1, wherein:

the program instructions, that when executed by the one or more processors, further cause the one or more processors to at least:

determine, based at least in part on an initial portion of textual content included in the content page, a first textual feature;

determine, based at least in part on a plurality of keywords identified in the textual content included in the content page, a second textual feature; and determine, based at least in part on a media frequency of a media item presented on the content page, a media feature associated with the content page; and the determination that the content page includes spamming content is further based at least in part on the first textual feature, the second textual feature, and the media feature.

3. The computing system of claim 2, wherein the media frequency of the media item corresponds to a determination that at least one page other than the content page includes the media item.

4. The computing system of claim 2, wherein, prior to the determination that the content page includes spamming content, the first textual feature and the second textual feature are processed using a multi-lingual distil-bidirectional encoder representations from transformers (distil-BERT) model.

5. The computing system of claim 2, wherein determination of the second textual feature includes:

determining a plurality of text sources of the textual content;

extracting, from one or more text sources of the plurality of text sources, a respective plurality of keywords;

determining a weight for one or more keywords of the respective plurality of keywords;

selecting at least a portion of the respective plurality of keywords according to the weights of the respective plurality of keywords;

concatenating one or more segments associated with the selected portion of the respective plurality of keywords to generate a concatenation of text segments; and tokenizing the concatenation of text segments.

6. The computing system of claim 5, wherein one or more of the weights is a term frequency inverse document frequency (TF-IDF) weight.

7. The computing system of claim 1, wherein:

the corresponding embedding is an average embedding of a plurality of embeddings associated with sub-paths included in the sub-path group; and aggregating the corresponding embeddings includes concatenating the corresponding embeddings.

8. The computing system of claim 1, wherein determination of the second structural feature includes:

extracting, from the structure of the content page, the plurality of tags; and determining, for one or more tags of the plurality of tags, a respective tag ratio relating a frequency of the tag to a total number of tags.

9. The computing system of claim 1, wherein the program instructions, that when executed by the one or more processors, further cause the one or more processors to at least:

determine, based at least in part on a second plurality of tag paths defining a second structure of a second content page, a third structural feature associated with the second content page;

determine, based at least in part on a second tag frequency of a second plurality of tags defining the second structure of the second content page, a fourth structural feature associated with the second content page; and determine, using the trained machine learning model, that the second content page does not include spamming content based at least in part on the third structural feature and the fourth structural feature.

10. A computer-implemented method:

determining a media feature associated with a content page, the media feature corresponding to a media frequency of a media item included on the content page;

determining a first structural feature associated with the content page, the first structural feature corresponding to a plurality of tag paths defining a structure of the content page, wherein determining the first structural feature comprises:

obtaining a document object model (DOM) tree representing the structure of the content page;

traversing the DOM tree to identify a plurality of sub-paths from the plurality of tag paths within the DOM tree;

grouping the plurality of sub-paths into a plurality of sub-path groups, wherein each sub-path group specifies a starting tag depth range and comprises a subset of the plurality of sub-paths having a starting tag within the corresponding tag depth range;

generating, for each of the plurality of sub-path groups, a corresponding embedding; and aggregating the corresponding embeddings for each of the plurality of sub-path groups to generate the first structural feature;

determining a second structural feature associated with the content page, the second structural feature corresponding to a tag frequency of a plurality of tags defining the structure of the content page; and determining, using a trained machine learning model, that the content page includes spamming content based at least in part on the media feature, the first structural feature, and the second structural feature.

11. The computer-implemented method of claim 10, further comprising:

determining a first textual feature associated with a content page, the first textual feature corresponding to a subset of textual content included on the content page; and determining a second textual feature associated with the content page, the second textual feature corresponding to a plurality of keywords identified in the textual content included on the content page, wherein determining that the content page includes spamming content is further based at least in part on the first textual feature and the second textual feature.

12. The computer-implemented method of claim 10, wherein determining the second structural feature includes:

extracting, from the structure of the content page, the plurality of tags; and determining, for one or more tags of the plurality of tags, a respective tag ratio relating a frequency of the tag to a total number of tags.

13. The computer-implemented method of claim 11, wherein determination of the second textual feature includes:

determining a plurality of text sources of the textual content;

extracting, from one or more text sources of the plurality of text sources, a respective plurality of keywords;

determining a weight for one or more keywords of the respective plurality of keywords;

selecting at least a portion of the respective plurality of keywords according to the weights of the respective plurality of keywords;

concatenating one or more segments associated with the selected portion of the respective plurality of keywords to generate a concatenation of text segments; and tokenizing the concatenation of text segments.

14. The computer-implemented method of claim 10, further comprising:

determining, based at least in part on a second plurality of tag paths defining a second structure of a second content page, a third structural feature associated with the second content page;

determining, based at least in part on a second tag frequency of a second plurality of tags defining the second structure of the second content page, a fourth structural feature associated with the second content page; and determining, using the trained machine learning model, that the second content page does not include spamming content based at least in part on the third structural feature and the fourth structural feature.

15. One or more non-transitory computer storage media storing instructions that, when executed by one or more computers, causes the one or more computers to perform operations comprising:

determining a media feature associated with a content page, the media feature corresponding to a media frequency of a media item included on the content page;

determining a first structural feature associated with the content page, the first structural feature corresponding to a plurality of tag paths defining a structure of the content page, wherein determining the first structural feature comprises:

obtaining a document object model (DOM) tree representing the structure of the content page;

traversing the DOM tree to identify a plurality of sub-paths from the plurality of tag paths within the DOM tree;

grouping the plurality of sub-paths into a plurality of sub-path groups, wherein each sub-path group specifies a starting tag depth range and comprises a subset of the plurality of sub-paths having a starting tag within the corresponding tag depth range;

generating, for each of the plurality of sub-path groups, a corresponding embedding; and aggregating the corresponding embeddings for each of the plurality of sub-path groups to generate the first structural feature;

determining a second structural feature associated with the content page, the second structural feature corresponding to a tag frequency of a plurality of tags defining the structure of the content page; and determining, using a trained machine learning model, that the content page includes spamming content based at least in part on the media feature, the first structural feature, and the second structural feature.

16. The one or more non-transitory computer storage media of claim 15, further comprising:

determining a first textual feature associated with a content page, the first textual feature corresponding to a subset of textual content included on the content page; and determining a second textual feature associated with the content page, the second textual feature corresponding to a plurality of keywords identified in the textual content included on the content page, wherein determining that the content page includes spamming content is further based at least in part on the first textual feature and the second textual feature.

17. The one or more non-transitory computer storage media of claim 16, wherein determination of the second textual feature includes:

determining a plurality of text sources of the textual content;

extracting, from one or more text sources of the plurality of text sources, a respective plurality of keywords;

determining a weight for one or more keywords of the respective plurality of keywords;

selecting at least a portion of the respective plurality of keywords according to the weights of the respective plurality of keywords;

concatenating one or more segments associated with the selected portion of the respective plurality of keywords to generate a concatenation of text segments; and tokenizing the concatenation of text segments.

18. The one or more non-transitory computer storage media of claim 15, wherein determining the second structural feature includes:

extracting, from the structure of the content page, the plurality of tags; and determining, for one or more tags of the plurality of tags, a respective tag ratio relating a frequency of the tag to a total number of tags.

19. The one or more non-transitory computer storage media of claim 15, further comprising:

determining, based at least in part on a second plurality of tag paths defining a second structure of a second content page, a third structural feature associated with the second content page;

determining, based at least in part on a second tag frequency of a second plurality of tags defining the second structure of the second content page, a fourth structural feature associated with the second content page; and determining, using the trained machine learning model, that the second content page does not include spamming content based at least in part on the third structural feature and the fourth structural feature.

* * * * *